Nov. 8, 1955     S. H. SPENCER     2,722,827
ROLL BALANCE WEIGHING MECHANISM FOR
CENTER OF GRAVITY DETERMINATION
Filed Aug. 12, 1954
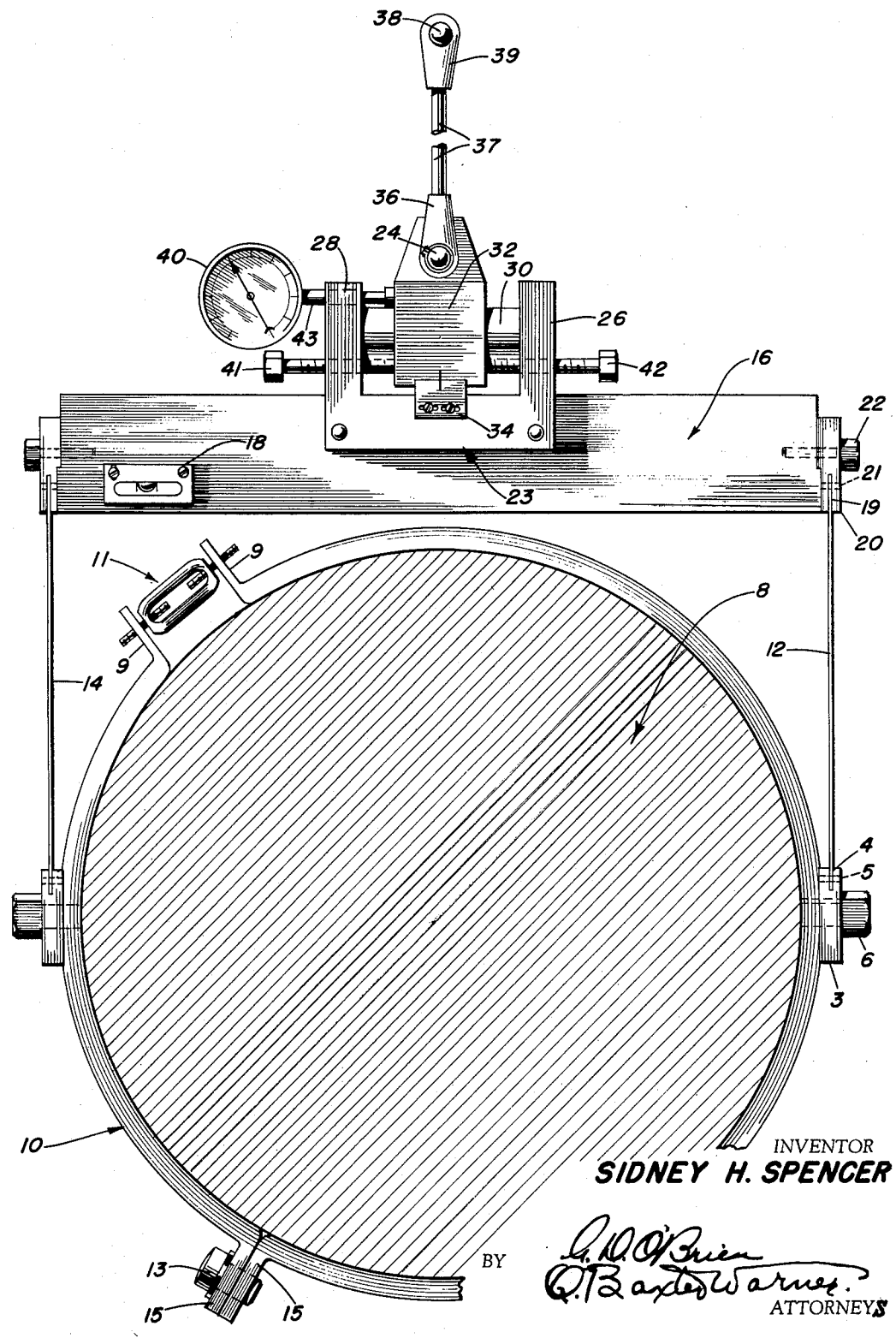
INVENTOR
SIDNEY H. SPENCER
BY
ATTORNEYS

United States Patent Office 2,722,827
Patented Nov. 8, 1955

2,722,827
ROLL BALANCE WEIGHING MECHANISM FOR CENTER OF GRAVITY DETERMINATION

Sidney H. Spencer, Hyattsville, Md., assignor to the United States of America as represented by the Secretary of the Navy Application August 12, 1954, Serial No. 449,531

6 Claims. (Cl. 73—65)

This invention relates generally to apparatus for locating the center of gravity of a body, and more particularly it pertains to a roll balance weighing mechanism for determining the location of the center of gravity of a body with respect to the geometrical axis of the body. This invention is illustrated in conjunction with an aerial missile. It is not limited in use to the determination of the center of gravity of the missile, but can be utilized for determining the center of gravity of other types of bodies.

It is one of the objects of this invention to provide a mechanism for directly locating the center of gravity of a body with respect to its geometrical axis.

Another object of this invention is to provide a mechanism for determining the center of gravity of a body, which information can be utilized to properly adjust the inaccuracies in the location of the center of gravity of the body with respect to its geometrical axis.

Another object of this invention is to provide a roll balance weighing mechanism which is of a simple equi-arm type for measuring the center of gravity of a body with respect to the geometrical axis of the body.

Still another object of this invention is to provide a roll balance weighing mechanism which is economical to manufacture, easy to install, and one which is reliable and efficient in operation in determining the center of gravity of a body with respect to its geometrical axis.

Other objects and many of the attendant advantages of this invention will be readily appreciated as the same becomes better understood by reference to the following detailed description when considered in connection with the single drawing which illustrates the roll balance weighing mechanism.

In accordance with the invention, a roll balance weighing mechanism is provided for measuring the location of the center of gravity of a missile with respect to the geometrical axis of the missile. This mechanism comprises means for clamping the missile whose center of gravity is to be determined, together with an equi-arm balance bar which includes two flexible straps for supporting the clamping means. In addition, the mechanism includes a yoke means having a ground shaft passing therethrough and which is attached to the equi-arm balance bar near the center thereof.

Fulcrum means surround the ground shaft and are attached to a fixed support. Additional means are provided for adjusting the fulcrum means along the ground shaft together with an index plate located on the yoke means. The equi-arm balance bar has a leveling means provided thereon for leveling the missile. Additional means are provided in the mechanism for indicating the distance between the center of gravity of the missile and the geometrical axis thereof when the missile is placed in the clamping means.

Referring now to the drawing there is illustrated an aerial missile 8 which is located in a trunnion ring 10. This trunnion ring 10 is approximately two inches in thickness and four to five inches in width. The ring has a turnbuckle 11 mounted between two flanges 9 for tightening the ring 10 about the missile 8. The ring 10 also has two other flanges 15 which are held together by means of a bolt 13 so that the trunnion ring 10 can be placed about the missile 8.

Trunnion ring 10 is supported by two flexible straps 12 and 14. The lower ends of these flexible straps 12 and 14 are received in slots 4 provided in metal blocks 3. These metal blocks 3 are located diametrically opposite each other on the trunnion ring 10. The lower ends of the straps 12 and 14 are pinned in the slots 4 by pins 5. These metal blocks 3 are then attached to the trunnion ring 10 by means of bolts 6.

The upper ends of the flexible straps 12 and 14 are connected to the opposite ends of an equi-arm balance bar 16 by means of metal blocks 20. These blocks 20 have slots 19 provided therein for receiving the upper ends of the metal straps 12 and 14. The upper ends of the metal straps are maintained in the slots 19 by pins 21. The metal blocks 20 are then attached to the equi-arm balance bar 16 by means of bolts 22. A bubble level dial 18 is provided on the equi-arm balance bar 16 for indicating the position of the bar when a missile 8 is located in the trunnion ring 10.

The equi-arm balance bar 16 is connected to a yoke 23 having two vertical uprights 26 and 28 for receiving a ground shaft 30. This ground shaft 30 passes through a fulcrum or trunnion block 32 which is connected by means of a clevis pin 24 to a clevis terminal 36, and the latter, in turn, is connected to a steel cable 37. Cable 37, in turn, is connected to a terminal clevis 39 which is then connected to a fixed support located at point 38.

A movable index plate 34 is provided on yoke 23. The trunnion block 32 is adjustable along the ground shaft 30 by means of bolts 41 and 42 which can be adjusted one inwardly and the other outwardly, to move the block 32. A dial indicator 40, having an adjustable arm 43, is supported by the vertical upright 28 adjacent the fulcrum block 32. This dial indicator 40 can be of the Ames type. It is utilized to indicate the distance that the trunnion or fulcrum block 32 moves when the missile 8 is placed in the trunnion ring 10 in order to measure the distance between the center of gravity of the missile 8 and the geometrical axis thereof.

In operation, the index plate 34 is placed mid-distance between the length of the equi-arm balance bar 16. The trunnion block 32 is then adjusted by means of bolts 41 and 42 until the center of the trunnion block 32 is in line with the index mark on the index plate 34. The Ames dial indicator 40 is then set to zero. The missile 8 is then placed in the trunnion ring 10, and the turnbuckle 11 is adjusted until the missile is tightly secured in the trunnion ring 10.

If the center of gravity of the missile 8 is not located along the geometrical axis of the missile, the equi-arm balance bar 16 will have a tendency to rotate to the left or to the right and out of a horizontal position. The bubble level dial 18 will indicate which direction the missile 8 is out of the vertical. The trunnion block 32 is then adjusted to bring the bubble level dial 18 back into a level position. The dial indicator 40 is then read to indicate the amount that the center of gravity of the missile 8 is located from the geometrical axis thereof. This will give one of the components of the distance between the center of gravity of the missile 8 and the geometrical axis of the missile.

The missile 8 is then removed from the trunnion ring 10, and the plate index 34 and the fulcrum or trunnion block 32 are then adjusted to be in alignment and the dial indicator 40 is again set to a zero position. The missile 8 is again placed back into the trunnion ring 10 in a position 90° from the position previously used in the above mentioned procedure. The rest of the steps outlined above are followed, and a second component representing the distance between the center of gravity of the missile 8 and the geometrical axis of the missile is obtained.

These components that are obtained by this procedure are then plotted as vectors, one in the horizontal direction and the other in the vertical direction, and are then added vectorially to determine the resultant of the vector components as well as the amplitude or direction of the resultant vector. This information can then be utilized to properly adjust the inaccuracies in the location of the center of gravity of the missile with respect to its geometrical axis.

Obviously many modifications and variations of the present invention are possible in the light of the above teachings. It is therefore to be understood that within the scope of the appended claims the invention may be practiced otherwise than as specifically described.

What is claimed is:

1. A roll balance mechanism for measuring the location of the center of gravity of a body with respect to its geometrical axis, comprising, structure including an equi-arm balance bar for supporting said body, a yoke means including two arms having a shaft passing therethrough, said shaft being arranged substantially parallel to said bar, said yoke means being attached to said equi-arm balance bar near the center thereof, fulcrum means arranged transverse to and surrounding said shaft and attached to a support, means for adjusting said fulcrum means along said shaft, an index plate located on said yoke means for indicating the position of said fulcrum means, a leveling means located on said equi-arm balance bar, and means for indicating the distance that said fulcrum means are adjusted when said body is placed in said supporting structure.

2. A roll balance mechanism for measuring the location of the center of gravity of a missile with respect to its geometrical axis, comprising, means for clamping said missile, an equi-arm balance bar including two flexible straps for supporting said clamping means, a yoke means including two arms having a shaft passing therethrough, said shaft being arranged substantially parallel to said bar, said yoke means being attached to said equi-arm balance bar near the center thereof, fulcrum means arranged transverse to and surrounding said shaft and being attached to a fixed support, means for adjusting said fulcrum means along said shaft, an index plate located on said yoke means for indicating the position of said fulcrum means, a leveling means located on said equi-arm balance bar, and means for indicating the distance that said fulcrum means are adjusted when said missile is placed in said clamping means.

3. A mechanism for determining the location of the center of gravity of a body with respect to the geometrical axis thereof, comprising, structure including a balance bar for supporting said body, yoke means including a shaft passing therethrough, said shaft being arranged substantially parallel to said bar, said means being attached to said balance bar near the center thereof, means including a fulcrum arranged transverse to and surrounding said shaft and attached to a support, means for adjusting said fulcrum along said shaft, and means for indicating the distance that said fulcrum is adjusted when said body is placed in said supporting structure.

4. A mechanism for determining the location of the center of gravity of a body with respect to its geometrical axis, comprising, structure including an equi-arm balance bar for supporting said body, yoke means having a shaft passing therethrough, said shaft being arranged substantially parallel to said bar, said means being attached to said balance bar near the center thereof, fulcrum means arranged transverse to and surrounding said shaft and attached to a fixed support, means for adjusting said fulcrum means along said shaft, and means for indicating the distance that said fulcrum means are adjusted when said body is placed in said supporting structure.

5. An arrangement as set forth in claim 4, and leveling means located on said equi-arm balance bar for determining the position of said bar.

6. An arrangement as set forth in claim 4, wherein said means attached to the equi-arm balance bar near the center thereof comprises a yoke having two arms for receiving said shaft, and an index plate located on said yoke for indicating the position of said fulcrum means.

References Cited in the file of this patent
FOREIGN PATENTS

| 283,523 | Germany | Apr. 20, 1915 |
| 303,327 | Germany | July 12, 1919 |
| 387,093 | Germany | Dec. 21, 1923 |